United States Patent
Sakata et al.

(10) Patent No.: US 6,686,776 B2
(45) Date of Patent: Feb. 3, 2004

(54) DIGITAL DATA COINCIDENCE DETERMINING CIRCUIT

(75) Inventors: Kohji Sakata, Gifu (JP); Hirofumi Saitoh, Ogaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 10 days.

(21) Appl. No.: 10/066,723

(22) Filed: Feb. 6, 2002

(65) Prior Publication Data

US 2002/0105357 A1 Aug. 8, 2002

(30) Foreign Application Priority Data

Feb. 6, 2001 (JP) ....................... 2001-029160
Sep. 25, 2001 (JP) ....................... 2001-290820

(51) Int. Cl.$^7$ ............................................ A03K 19/096
(52) U.S. Cl. ............................. 326/95; 326/97; 326/98; 326/52; 326/54; 326/55
(58) Field of Search ...................... 326/52–55, 95, 326/98, 112, 119

(56) References Cited

U.S. PATENT DOCUMENTS 5,291,076 A * 3/1994 Bridges et al. ............. 307/449
5,694,362 A * 12/1997 Zhang et al. ............. 365/189.07
5,872,467 A * 2/1999 Huang ..................... 327/63

* cited by examiner

Primary Examiner—Anh Tran
(74) Attorney, Agent, or Firm—Westerman, Hattori, Daniels & Adrian, LLP

(57) ABSTRACT

A coincidence determining circuit determines whether first and second digital data each consisting of a plurality of bits coincide with one another. The coincidence determining circuit includes a wiring and a plurality of bit comparison circuits corresponding in number to the bits. Each bit comparison circuit includes first and second transistors connected in series between the wiring and a power supply line and third and fourth transistors connected in series between the wiring and the power supply line. The first and second transistors receive a first logical signal of an associated bit of the first digital data and an inverted signal of a second logical signal of an associated bit of the second digital data. The third and fourth transistors receive an inverted signal of the first logical signal and the second logical signal. The four transistors of each bit comparison circuit suppress an increase in circuit area.

7 Claims, 19 Drawing Sheets

Fig.3(a) CLK1 
Fig.3(b) DataA 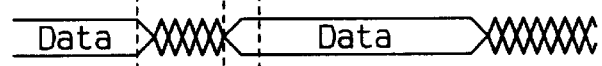
Fig.3(c) DataB 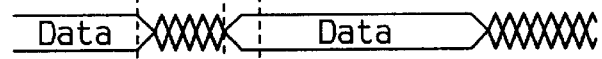
Fig.3(d) CLK2 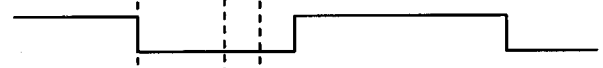
Fig.3(e) Output 
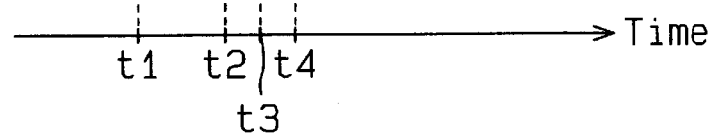

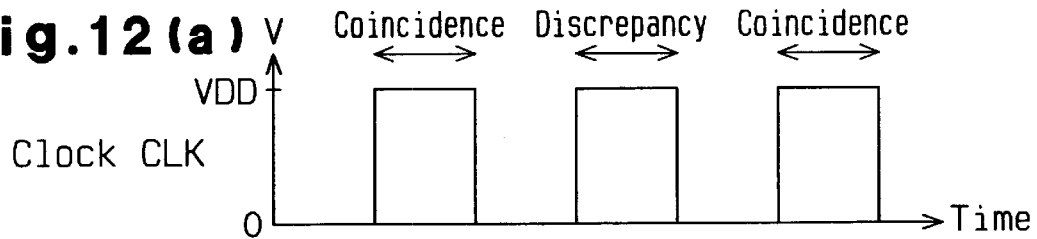
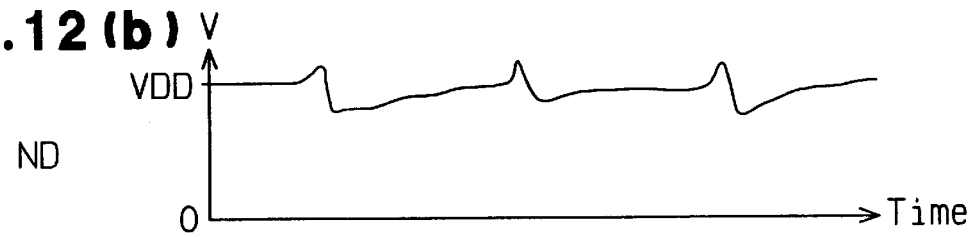
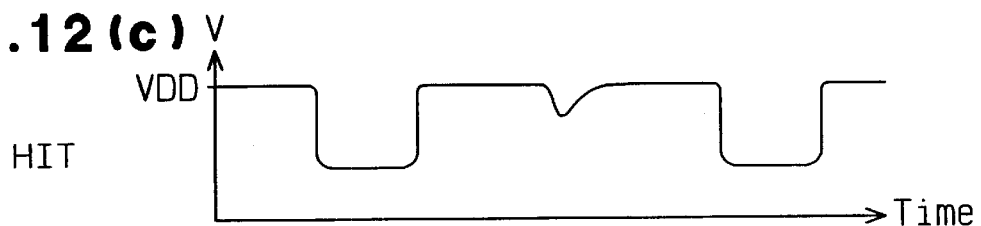
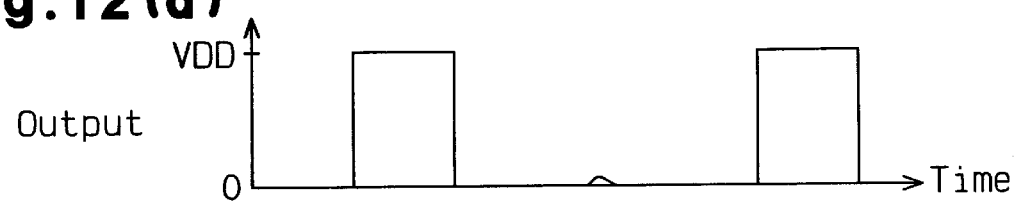

Case where data A and B coincide with each other

Case where data A and B do not coincide with each other

_US 6,686,776 B2_

DIGITAL DATA COINCIDENCE DETERMINING CIRCUIT

BACKGROUND OF THE INVENTION

The present invention relates to a digital data coincidence determining circuit, and, more particularly, to a coincidence determining circuit which determines whether plural pieces of digital data coincide with one another by comparing the digital data bit by bit.

There is an address comparator for a memory circuit, which determines whether two pieces of digital data coincide with each other by comparing the two pieces of digital data bit by bit. FIG. 1 is a schematic circuit diagram of a conventional coincidence determining circuit 100. The coincidence determining circuit 100 determines whether two pieces of digital data A and B each consisting of n bits coincide with each other. The digital data A consists of bits $A_0, A_1, \ldots, A_{n-1}$ and the digital data B consists of bits $B_0, B_1, \ldots, B_{n-1}$. The complementary values of the individual bits of the digital data A are $/A_0, /A_1, \ldots, /A_{n-1}$ and the complementary values of the individual bits of the digital data B are $/B_0, /B_1, \ldots, /B_{n-1}$. The coincidence determining circuit 100 includes exclusive OR circuits $XOR_0$, $XOR_1, \ldots, XOR_{n-1}$ for determining whether the digital data A and B coincide with each other by comparing the digital data A and B bit by bit. Each of the exclusive OR circuits $XOR_0, XOR_1, \ldots, XOR_{n-1}$ generates a signal of a logical level "L" (Low) when the associated two bits coincide with each other, and generates a signal of a logical level "H" (High) when there is no coincidence.

The output signals of the exclusive OR circuits $XOR_0$, $XOR_1, \ldots, XOR_{n-1}$ are applied to the gates of n-channel transistors $TNS'_0, TNS'_1, \ldots, TNS'_{n-1}$. Each transistor is connected between a wiring 110, which is precharged to a high potential in a given clock cycle, and the ground. In case where at least one of the bits of the digital data A does not coincide with the associated bit of the digital data B, that transistor which is connected to the associated exclusive OR circuit is turned on, thus electrically connecting the wiring 110 to the ground. In case where all of the bits of the digital data A coincide with the associated bits of the digital data B, all of the transistors are turned off, thus electrically disconnecting the wiring 110 from the ground.

The coincidence/non-coincidence determining operation of the coincidence determining circuit 100 is performed as follows.

First, when a clock signal CLK1 has a logical level "L", the wiring 110 is precharged to a supply voltage VDD, supplying data to the individual exclusive OR circuits $XOR_0, XOR_1, \ldots, XOR_{n-1}$. When the clock signal CLK1 rises to a logical level "H" thereafter, the wiring 110 is electrically disconnected from the power supply. When the digital data A and B coincide with each other, the wiring 110 becomes a high-impedance state and the potential of the wiring 110 is held at nearly the logical level "H". When the digital data A and B do not coincide with each other, on the other hand, the wiring 110 is electrically connected to the ground, so that the potential of the wiring 110 is pulled down to the logical level "L".

A change in the potential of the wiring according to the coincidence or non-coincidence of the digital data A and B is read through an AND circuit 111. The AND circuit 111 outputs a logical product of a clock signal CLK2 and the potential of the wiring. The clock signal CLK2 rises with a delay from the rising of the clock signal CLK1. The AND circuit 111 generates a signal of a logical level "H" when the digital data A and B coincide with each other and generates a signal of a logical level "L" when they do not coincide with each other.

In this manner, the coincidence determining circuit 100 determines whether two pieces of digital data coincide with each other. In the present specification, a high potential (the supply voltage VDD or VDD−Vt (threshold value of a transistor)) is defined as the logical level "H" and a low potential (the ground potential VSS or VSS+Vt) is defined as the logical level "L".

The circuit area of the coincidence determining circuit 100 increases as the number of bits of digital data increases. That is, every time the number of bits of digital data increases by one, an exclusive OR circuit XOR and an n-channel transistor should be additionally provided. It is therefore necessary to provide additionally nine transistors for an increase of one bit. In case of determining if three or more pieces of digital data coincide with one other, the circuit area of the coincidence determining circuit likewise increases with an increase in the number of pieces of digital data.

SUMMARY OF THE INVENTION

Accordingly, it is an object of the present invention to provide a digital data coincidence determining circuit which suppresses an increase in circuit area.

In a first aspect of the invention, there is provided a coincidence determining circuit for determining whether plural pieces of digital data, which includes first digital data and second digital data each consisting of a plurality of bits, coincide with one another. The coincidence determining circuit includes a wiring and a plurality of bit comparison circuits connected to the wiring and corresponding in number to the plurality of bits. Each bit comparison circuit includes first and second transistors connected in series between the wiring and a power supply line and third and fourth transistors connected in series between the wiring and the power supply line. The first transistor has a first control terminal to which a first logical signal of an associated bit of the first digital data is applied. The second transistor has a second control terminal to which an inverted signal of a second logical signal of an associated bit of the second digital data is applied. The third transistor has a third control terminal to which an inverted signal of the first logical signal is applied. The fourth transistor has a fourth control terminal to which the second logical signal is applied. The first to fourth transistors change a potential of the wiring by controlling conduction between the wiring and the power supply line and it is determined based on a change in the potential whether the plural pieces of digital data coincide with one another.

In a second aspect of the invention, there is provided a coincidence determining circuit for determining whether plural pieces of digital data, which includes first digital data and second digital data each consisting of a plurality of bits, coincide with one another. The coincidence determining circuit includes a wiring, a plurality of switching transistors connected in parallel between the wiring and a power supply line and corresponding in number to the plurality of bits, and a plurality of bit comparison circuits respectively connected to switching control terminals of the plurality of switching transistors. Each bit comparison circuit includes a first transistor having a first input/output terminal connected to the switching control terminal of an associated one of the switching transistors, a second input/output terminal and a first control terminal, and a second transistor having a third input/output terminal connected to the switching control terminal of an associated one of the switching transistors, a fourth input/output terminal and a second control terminal. A first logical signal of an associated bit of the first digital data, an inverted signal of the first logical signal, a second logical signal of an associated bit of the second digital data and an inverted signal of the second logical signal are respectively applied to the second and fourth input/output terminals and the first and second control terminals such that the associated switching transistor is turned off only when the associated bit of the first digital data coincides with the associated bit of the second digital data. As conduction of the plurality of switching transistors is controlled this way, a potential of the wiring changes and it is determined based on a change in the potential whether the plural pieces of digital data coincide with one another.

In a third aspect of the invention, there is provided a coincidence determining circuit for determining whether plural pieces of digital data, which includes first digital data and second digital data each consisting of a plurality of bits, coincide with one another. The coincidence determining circuit includes a plurality of first transistors connected in series between a first power supply and a second power supply and corresponding in number to the plurality of bits, and a plurality of bit comparison circuits respectively connected to first control terminals of the plurality of first transistors. Each bit comparison circuit includes a second transistor having a first input/output terminal connected to the first control terminal of an associated one of the first transistors, a second input/output terminal and a second control terminal, and a third transistor having a third input/output terminal connected to the first control terminal of an associated one of the first transistors, a fourth input/output terminal and a third control terminal. A first logical signal of an associated bit of the first digital data, an inverted signal of the first logical signal, a second logical signal of an associated bit of the second digital data and an inverted signal of the second logical signal are respectively applied to the second and fourth input/output terminals and the second and third control terminals such that the associated first transistor is turned off only when the associated bit of the first digital data coincides with the associated bit of the second digital data. As conduction of the plurality of first transistors is controlled this way, resistances among the plurality of first transistors change and it is determined based on changes in the resistances whether the plural pieces of digital data coincide with one another.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 3A to 3E show a time chart for explaining the operation of the coincidence determining circuit of FIG. 2;

FIGS. 12A to 12D show a time chart for explaining the operation of the coincidence determining circuit of FIG. 11;

DETAILED DESCRIPTION OF THE PREFERRED EMBODIMENTS

Figure 1:
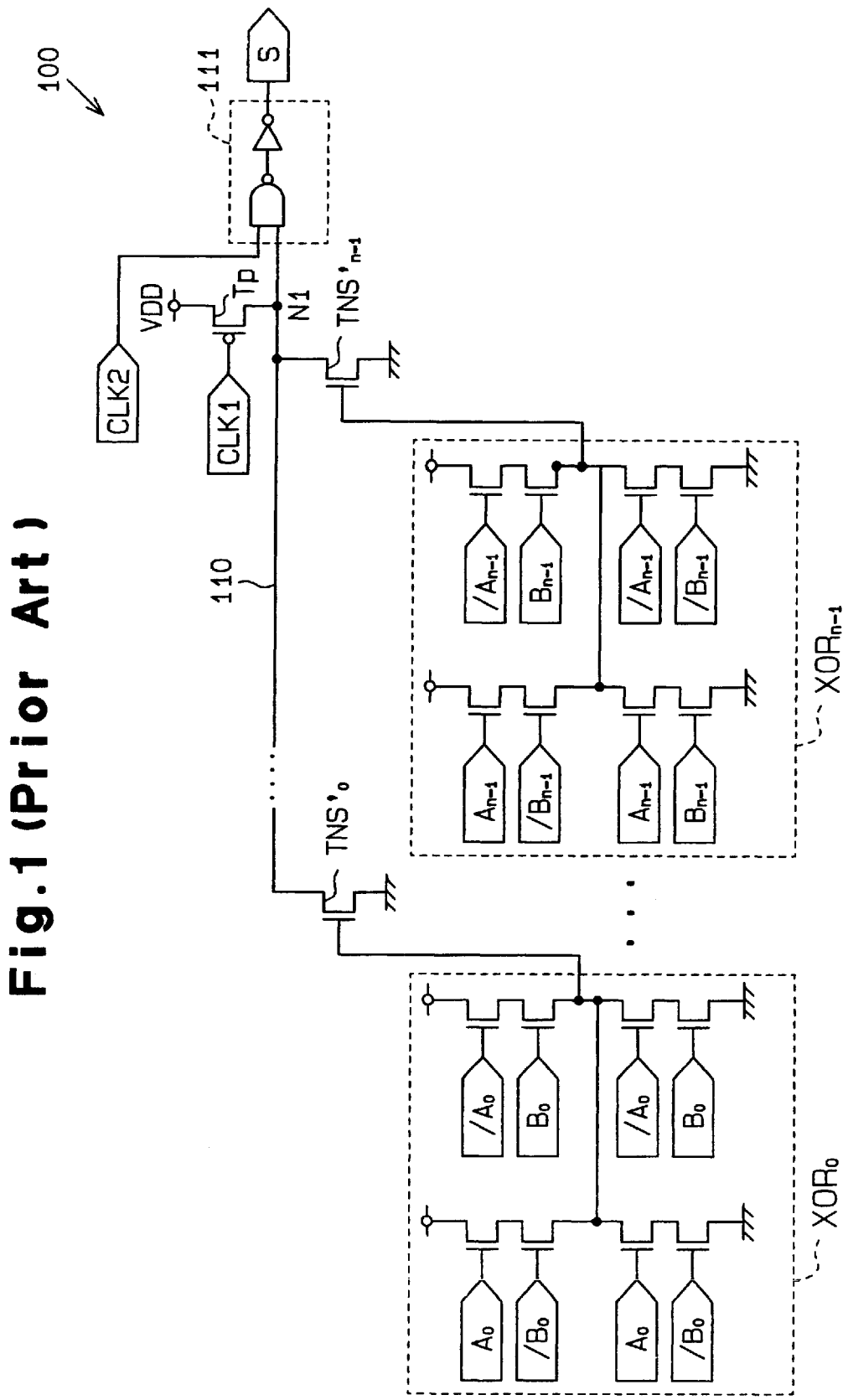
FIG. 1 is a schematic circuit diagram of a conventional digital data coincidence determining circuit.

In the drawings, like numerals are used for like elements throughout.

Figure 2:
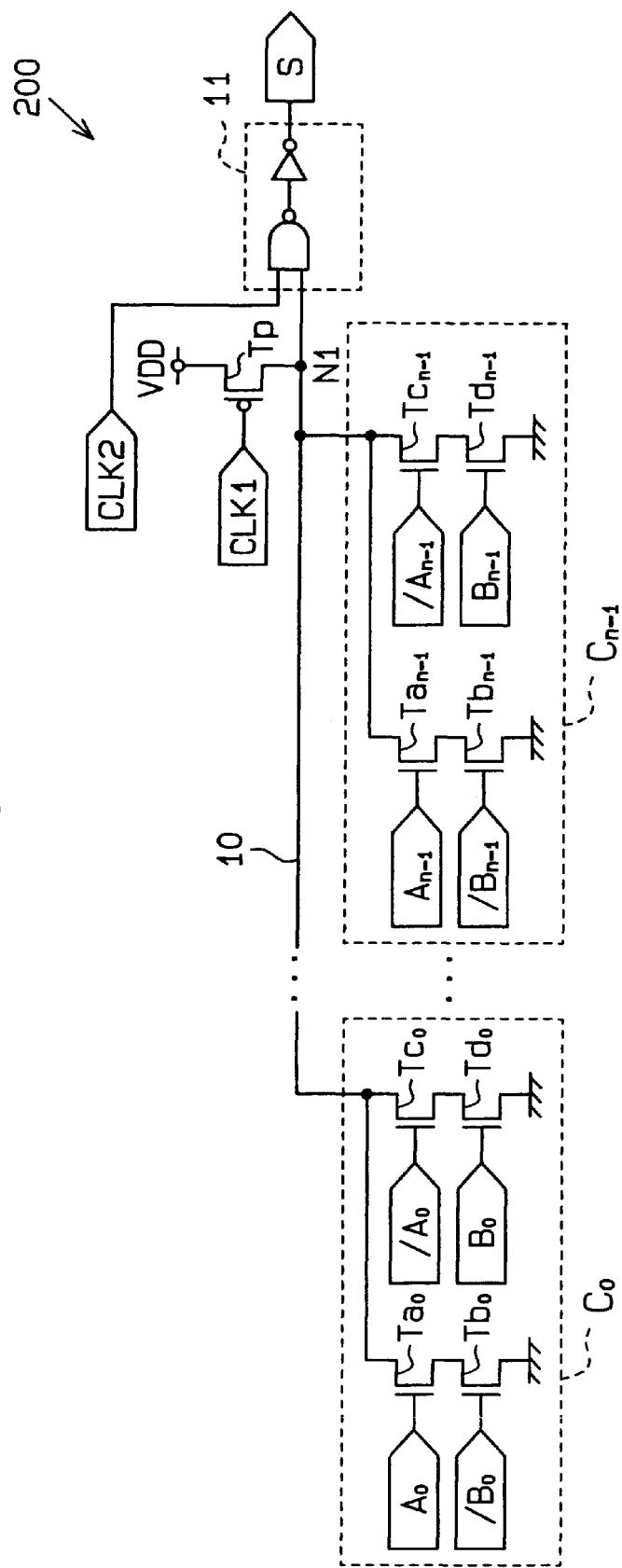
FIG. 2 is a schematic circuit diagram of a digital data coincidence determining circuit according to a first embodiment of the present invention.

FIG. 2 is a circuit diagram of a digital data coincidence determining circuit 200 according to the first embodiment of the present invention. The coincidence determining circuit 200 determines whether digital data A ($A_0, A_1, \ldots, A_{n-1}$) and digital data B ($B_0, B_1, \ldots, B_{n-1}$) each consisting of n bits coincide with each other.

The coincidence determining circuit 200 includes bit comparison circuits $C_0, \ldots, C_{n-1}$ which determine whether the digital data A and B coincide with each other bit by bit ($A_0$ with $B_0$, $A_1$ with $B_1$, $\ldots$, $A_{n-1}$ with $B_{n-1}$). Each bit comparison circuit pulls down the potential of a wiring 10 to the ground potential when the data bits do not coincide with each other.

Specifically, each of the bit comparison circuits $C_0, \ldots, C_{n-1}$ includes a first set of n-channel transistors ($Ta_0$ and $Tb_0, \ldots, Ta_{n-1}$ and $Tb_{n-1}$) and a second set of n-channel transistors ($Tc_0$ and $Td_0, \ldots, Tc_{n-1}$ and $Td_{n-1}$), each set connected in series between the wiring 10 and the ground. Applied to the gates of the first set of n-channel transistors ($Ta_0$ and $Tb_0, \ldots, Ta_{n-1}$ and $Tb_{n-1}$) respectively are a logical signal corresponding to the associated bit of the digital data A and the inverted signal of a logical signal corresponding to the associated bit of the digital data B. Applied to the gates of the second set of n-channel transistors ($Tc_0$ and $Td_0$, ..., $Tc_{n-1}$ and $Td_{n-1}$) respectively are the inverted signal of the logical signal corresponding to the associated bit of the digital data A and the logical signal corresponding to the associated bit of the digital data B.

When the bits of two pieces of digital data supplied to each bit comparison circuit coincide with each other, the first and second sets of transistors are turned off. That is, for example, either the transistor $Ta_0$ or the transistor $Tb_0$ is turned off and either the transistor $Tc_0$ or the transistor $Td_0$ is turned off. This electrically disconnects the wiring 10 from the ground. When the bits of both digital data do not coincide with each other, on the other hand, one of the first and second sets of transistors is turned on. That is, for example, either the transistors $Ta_0$, $Tb_0$ or the transistors $Tc_0$, $Td_0$ are turned on. This electrically connects the wiring 10 to the ground.

According to the first embodiment, it is determined whether two pieces of digital data A and B coincide with each other as each bit comparison circuit detects if the potential of the wiring 10 is pulled down to the ground potential.

The coincidence determining circuit 200 includes a p-channel transistor Tp and an AND circuit 11. In response to a clock signal CLK1, the p-channel transistor Tp electrically connects the wiring 10 to the power supply of the supply voltage VDD in the cycle of the clock signal CLK1. The AND circuit 11 generates a logical product of a clock signal CLK2, which is delayed by a predetermined time from the clock signal CLK1, and the potential of the wiring 10.

The operation of the coincidence determining circuit 200 to determine a coincidence between the digital data A and B will be described with reference to FIGS. 3A through 3E.

At time t1, the clock signal CLK1 falls to the logical level "L" (FIG. 3A). In response to the falling of the clock signal CLK1, the p-channel transistor Tp is turned on, thus precharging the wiring 10. In case where the bits of digital data supplied to every bit comparison circuit have a coincidence, the wiring 10 is maintained to the logic H level during a period from the point where the bits of digital data supplied to every bit comparison circuit have been settled (FIG. 3B and FIG. 3C; time t2) to the point where the clock signal CLK1 rises (time t3).

After the potential of the wiring 10 is pulled up, the clock signal CLK2 rises at time t4 with a delay of a predetermined time since the rising of the clock signal CLK1. At this time, the AND circuit 11 outputs a signal with a logical level "H", indicating that the data A and B coincide with each other.

In case where the bits of digital data supplied to each bit comparison circuit do not coincide with each other, the wiring 10 is pulled down to the ground potential during a period from the point where the bits of digital data supplied to each bit comparison circuit have been settled (time t2) to the point where the clock signal CLK1 rises (time t3). In this case, the AND circuit 11 outputs a signal with a logical level "L" in synchronism with the clock signal CLK2, indicating that the data A and B do not coincide with each other.

The coincidence determining circuit 200 according to the first embodiment has the following advantages.

(1) Bit comparison circuits each comprising four n-channel transistors are used to determine whether digital data A and B coincide with each other bit by bit. Even if the number of bits of digital data increases, therefore, an increase in the circuit area of the coincidence determining circuit is restrained.

(2) Since the bit comparison circuits are directly connected to the wiring 10, the coincidence determining speed becomes faster than that of the coincidence determining circuit 100 of FIG. 1 in which the switching transistors are connected between the wiring and the ground.

(3) The AND circuit 11 outputs a decision result in synchronism with the clock signal CLK2 that rises when a predetermined delay time passes after precharging. Accordingly, a decision result is read out after the potential of the wiring 10 is settled in accordance with the coincidence or discrepancy of digital data A and B, so that generation of noise in the output of the AND circuit 11 is avoided.

(4) Digital data A and B are supplied to the bit comparison circuits in synchronism with the timing of precharging based on the clock signal CLK1. This facilitates the setting of the timing of supplying digital data.

A digital data coincidence determining circuit 300 according to the second embodiment of the present invention will be described centering on the difference from the coincidence determining circuit 200 of the first embodiment with reference to FIG. 4.

Figure 4:
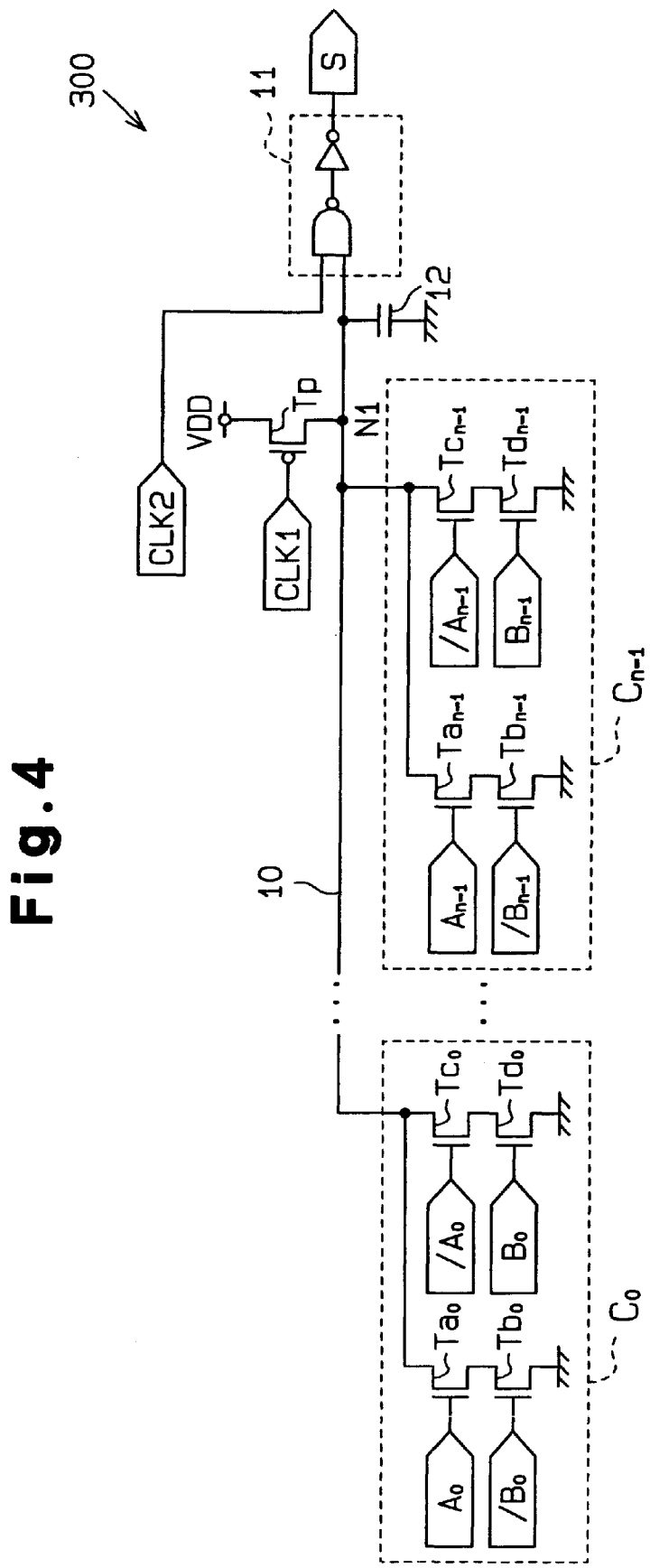
FIG. 4 is a schematic circuit diagram of a digital data coincidence determining circuit according to a second embodiment of the present invention.

According to the second embodiment, as shown in FIG. 4, a capacitor 12 is connected between the ground and a node between the AND circuit and a node N1 of the p-channel transistor Tp on the wiring 10. The capacitor 12 can allow the node N1 to be reliably maintained at the precharge potential even if the wiring 10 is in a high-impedance state due to a coincidence between two pieces of digital data.

The coincidence determining circuit 300 according to the second embodiment has the following advantages in addition to the advantages (1) to (4) of the first embodiment.

(5) The connection of the capacitor 12 to the wiring 10 optimizes the capacitance of the node N1. Even if the wiring 10 is in a high-impedance state, the node N1 is reliably maintained at the precharge potential.

A digital data coincidence determining circuit 400 according to the third embodiment of the present invention will be described centering on the difference from the coincidence determining circuit 300 of the second embodiment with reference to FIG. 5.

In the third embodiment, when the node N1 is not electrically connected to the ground, the power supply, which has the supply voltage used in precharging, supplies power to the wiring 10 to maintain the precharge potential applied to the node N1.

Figure 5:
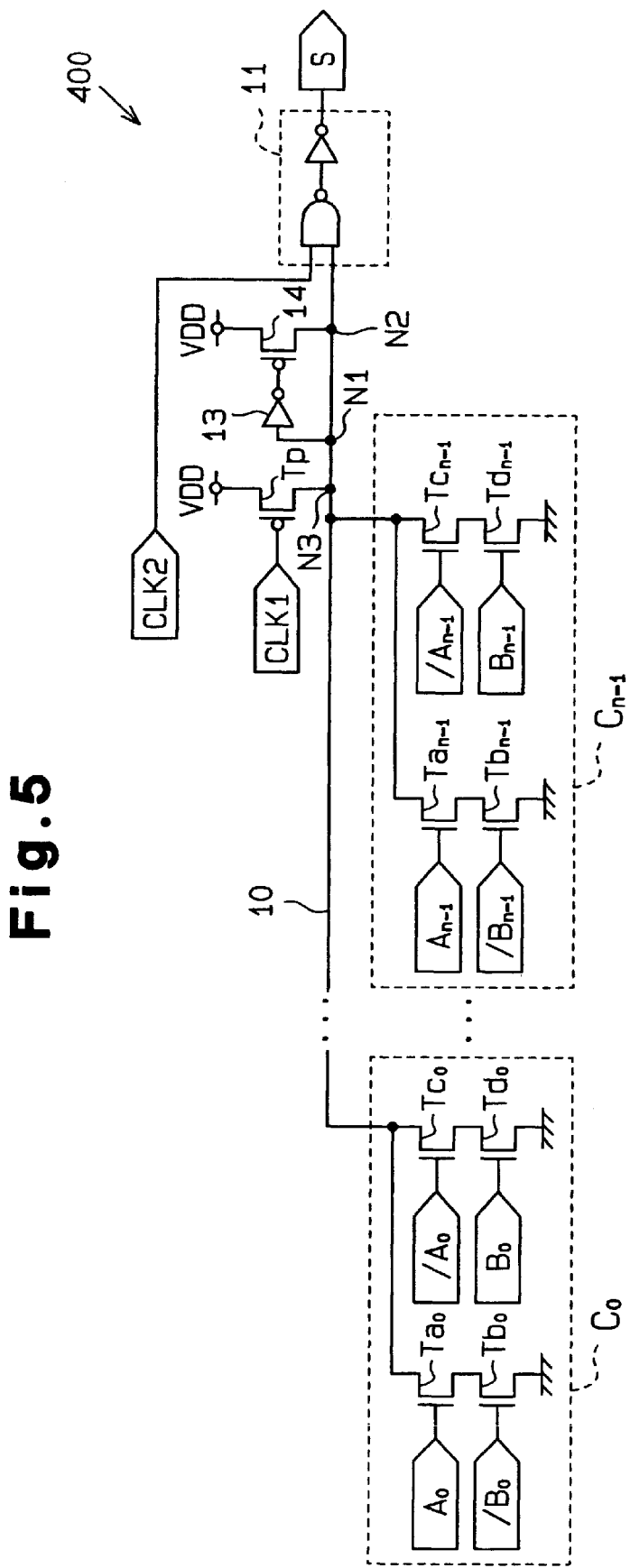
FIG. 5 is a schematic circuit diagram of a digital data coincidence determining circuit according to a third embodiment of the present invention.

As shown in FIG. 5, a p-channel transistor 14 is connected between the supply voltage VDD and a node N2 between the AND circuit 11 and the node N1 of the p-channel transistor Tp on the wiring 10. An inverter 13 is connected between the gate of the p-channel transistor 14 and a node N3 between the node N1 and the node N2. The inverter 13 generates a signal whose logical level is the inverted logical level of the potential at the node N1. The p-channel transistor 14 electrically connects the power supply of the supply voltage VDD to the wiring 10 in response to the inverted signal from the inverter 13.

When digital data A and B coincide with each other, the supply voltage VDD is applied to the wiring 10 via the transistor Tp, thus precharging the wiring 10. As a result, the inverter 13 applies an inverted signal of the logical level "L" to the gate of the transistor 14. In response to the inverted signal, the transistor 14 is turned on so that the supply voltage VDD is applied to the wiring 10 via the transistor 14.

The power supply to the wiring 10 via the transistor 14 continues after the transistor Tp is turned off by the rising of the clock signal CLK1. When the digital data A and B coincide with each other, therefore, the potential at the node N1 is maintained at the logical level "H".

In case where the digital data A and B do not coincide with each other, when the transistor Tp is turned off by the rising of the clock signal CLK1, the wiring 10 is electrically connected to the ground, thereby pulling down the potential at the node N1 to the ground potential. At this time, the inverter 13 outputs an inverted signal of the logical level "H", turning off the transistor 14. When the digital data A and B do not coincide with each other, therefore, the potential at the node N1 is maintained at the logical level "L".

The coincidence determining circuit 400 according to the third embodiment has the following advantage in addition to the advantages (1) to (4) of the coincidence determining circuit 300 of the second embodiment.

(6) When the potential at the node N1 exceeds the threshold value of the inverter 13, the supply voltage VDD is applied to the wiring 10 via the transistor 14. When the digital data A and B coincide with each other, therefore, the supply voltage VDD is applied to the wiring 10. The node N1 on the wiring 10 is therefore reliably maintained at the precharge potential so that the wiring 10 is not likely to be affected by noise.

The first to third embodiments may be modified as follows.

(a) The clock signal CLK1 may be let fall to perform precharging after data supply to each bit comparison circuit is completed (time t2 in FIGS. 3A to 3E). In this case, the consumed current that flows down to the ground from a high-potential power supply via the transistor Tp, is reduced.

Figure 6:
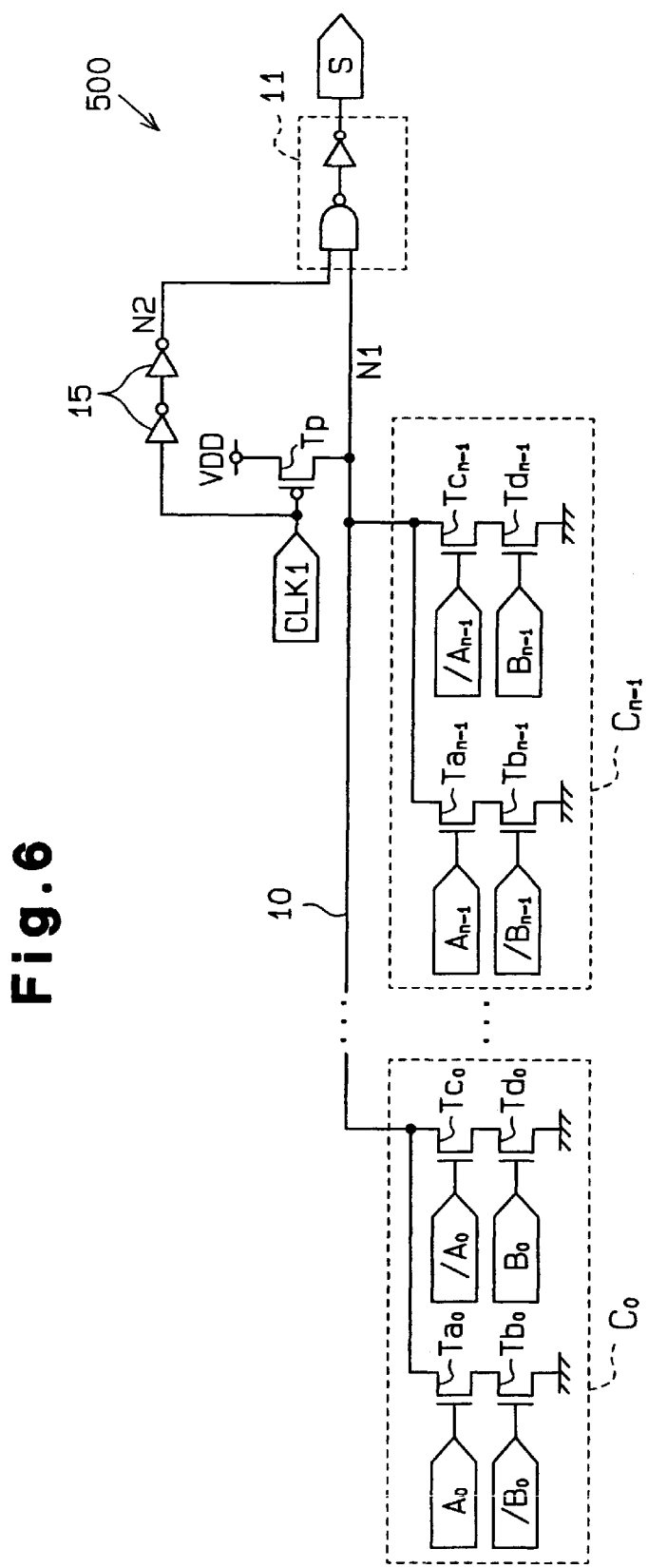
FIG. 6 is a schematic circuit diagram showing a modification of the coincidence determining circuit of FIG. 2.
Figure 7:
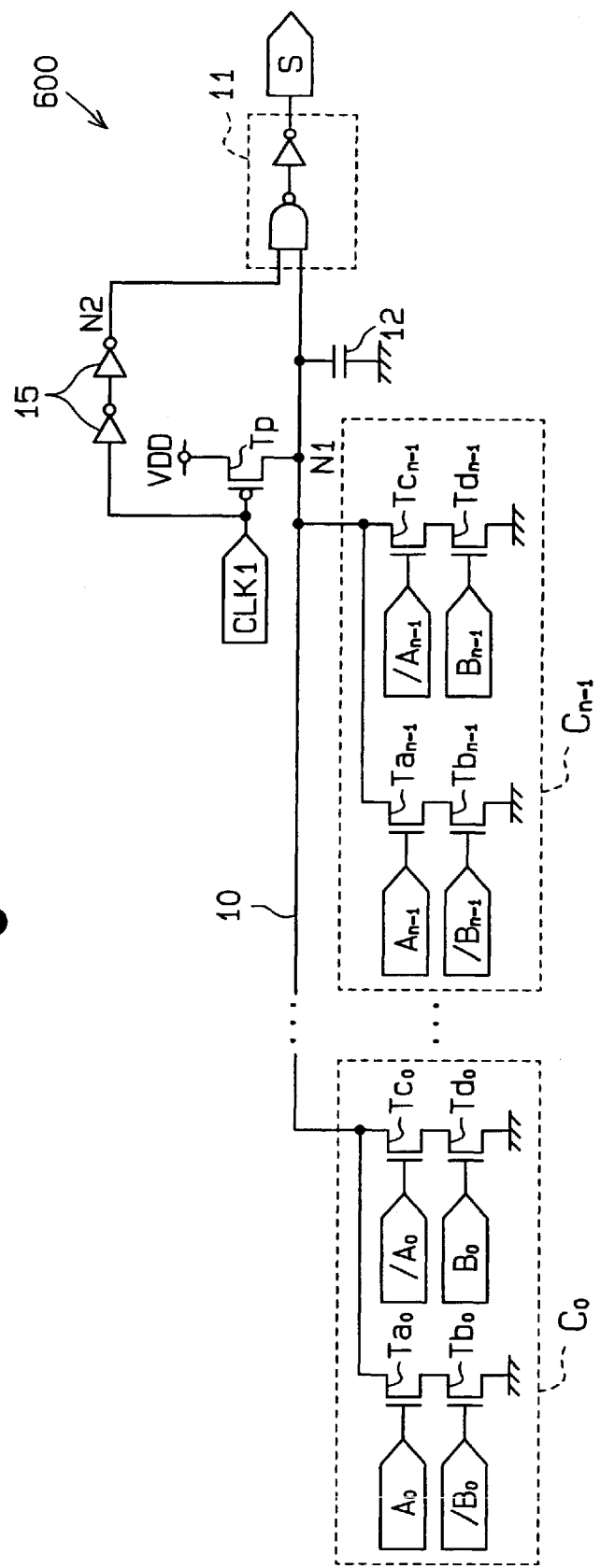
FIG. 7 is a schematic circuit diagram showing a modification of the coincidence determining circuit of FIG. 4.
Figure 8:
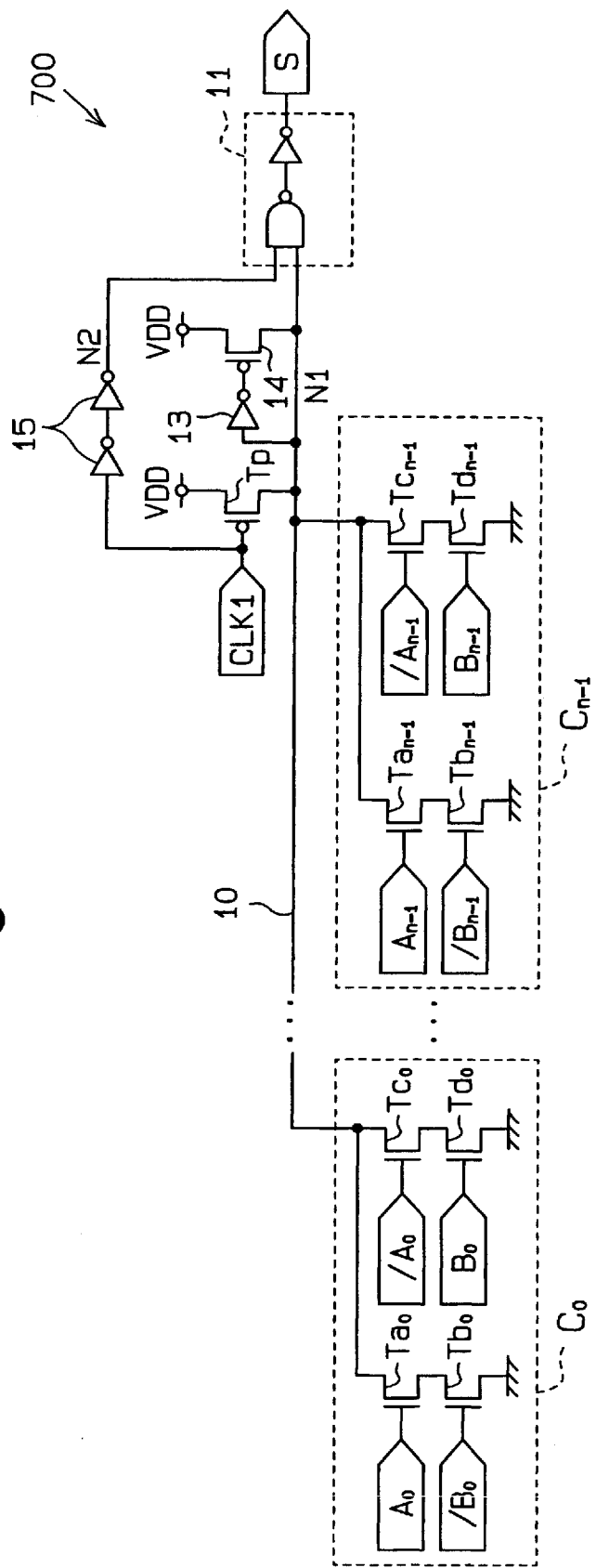
FIG. 8 is a schematic circuit diagram showing a modification of the coincidence determining circuit of FIG. 5.

(b) The clock signal CLK1 may be delayed by a delay circuit and the delayed clock signal may be supplied to the AND circuit 11 instead of the clock signal CLK2. FIG. 6 is a schematic circuit diagram showing a coincidence determining circuit 500 which corresponds to the coincidence determining circuit 200 of the first embodiment and includes a delay circuit 15 connected between the gate of the transistor Tp and the AND circuit 11. FIG. 7 is a schematic circuit diagram showing a coincidence determining circuit 600 which corresponds to the coincidence determining circuit 300 of the second embodiment and includes the delay circuit 15. FIG. 8 is a schematic circuit diagram showing a coincidence determining circuit 700 which corresponds to the coincidence determining circuit 400 of the third embodiment and includes the delay circuit 15.

Figure 9:
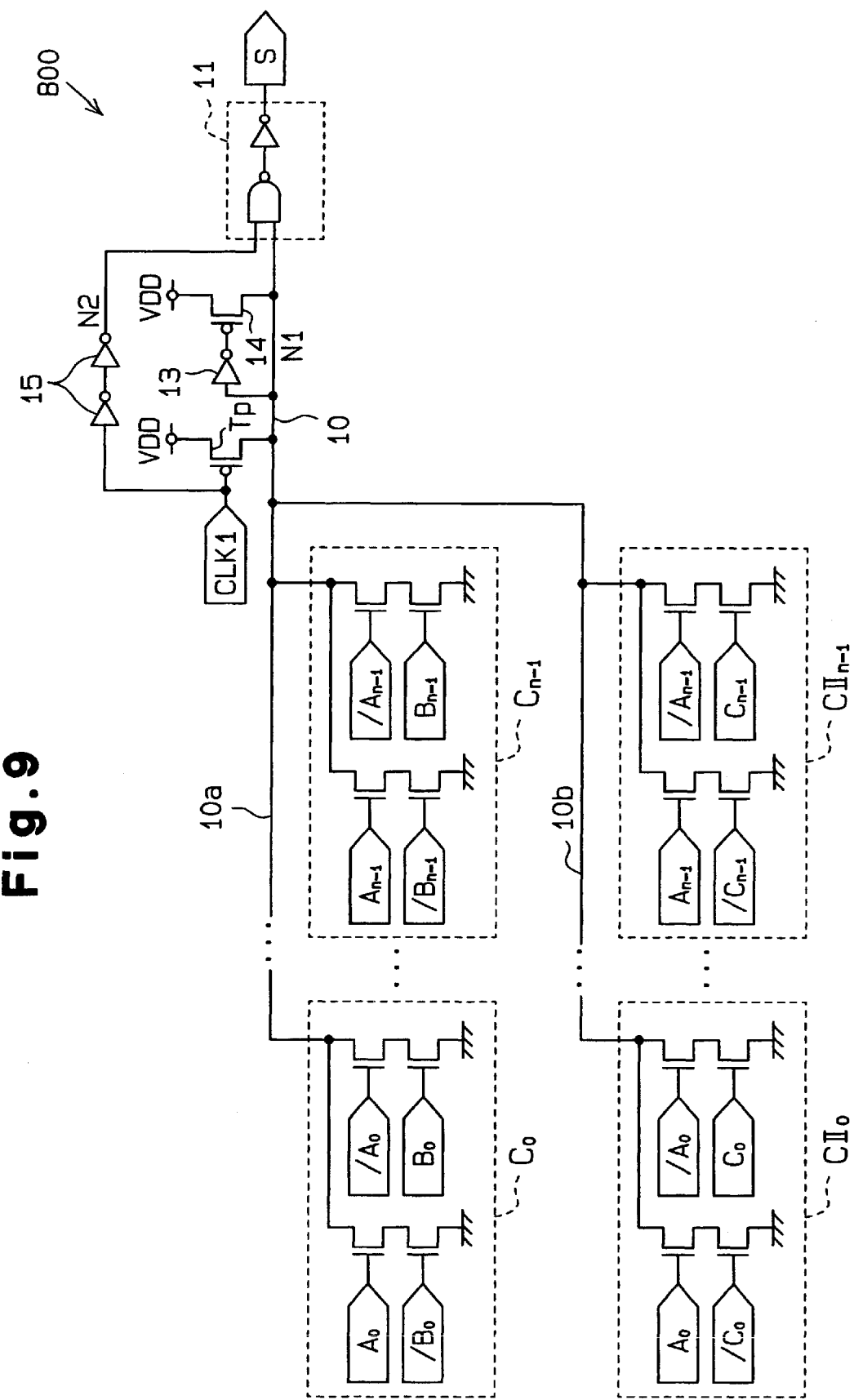
FIG. 9 is a schematic circuit diagram of a digital data coincidence determining circuit according to a fourth embodiment of the present invention.

A digital data coincidence determining circuit 800 according to the fourth embodiment of the present invention will be described with reference to FIG. 9.

The coincidence determining circuit 800 according to the fourth embodiment determines whether three pieces of digital data each consisting of n bits coincide with one another.

To determine whether plural pieces of digital data coincide with one another, some sets are selected from sets of two in plural pieces of digital data {(A, B), (A, C), (B, C)}. The selection of sets is performed to include every digital data and make it possible to determine if all digital data coincide with one another. Then, it is determined whether digital data in each of the selected sets coincide with each other. In the case of three pieces of digital data, for example, (A, B) and (A, C), (A, B) and (B, C), or (A, C) and (B, C) can be selected. In the fourth embodiment, it is determined whether digital data A and B coincide with each other bit by bit as well as whether digital data A and C coincide with each other bit by bit. That is, it is determined whether all digital data A, B and C coincide with each other bit by bit.

Specifically, the coincidence determining circuit 800 includes n bit comparison circuits $C_0, \ldots, C_{n-1}$ for determining whether the digital data A and B coincide with each other bit by bit and n bit comparison circuits $CII_0, \ldots, CII_{n-1}$ for determining whether the digital data A and C coincide with each other bit by bit. The bit comparison circuits $C_0, \ldots, C_{n-1}$ are connected in parallel to a wiring 10a and the bit comparison circuits $CII_0, \ldots, CII_{n-1}$ are connected in parallel to a wiring 10b. The wirings 10a and 10b are connected to the wiring 10.

In case where all of the digital data A, B and C coincide with one another, the wiring 10 is pulled up to a high potential by precharging and is maintained at the high potential. The AND circuit 11 therefore outputs a signal of the logical level "H". In other cases than the case where all of the digital data A, B and C coincide with one another, the wiring 10 (node N1) is electrically connected to the ground. Therefore, the AND circuit 11 outputs a signal of the logical level "L" as the result of the determination.

The coincidence determining circuit 800 according to the fourth embodiment has the following advantage in addition to the advantages (1) to (4) and (6) of the coincidence determining circuit 400 of the third embodiment.

(7) Since the coincidence determining circuit 800 includes two groups of bit comparison circuits ($C_0, \ldots, C_{n-1}$ and $CII_0, \ldots, CII_{n-1}$), the coincidence determining circuit 800 can compare three pieces of digital data A, B and C at the same time.

The coincidence determining circuit 800 of the fourth embodiment may be modified as follows.

Figure 10:
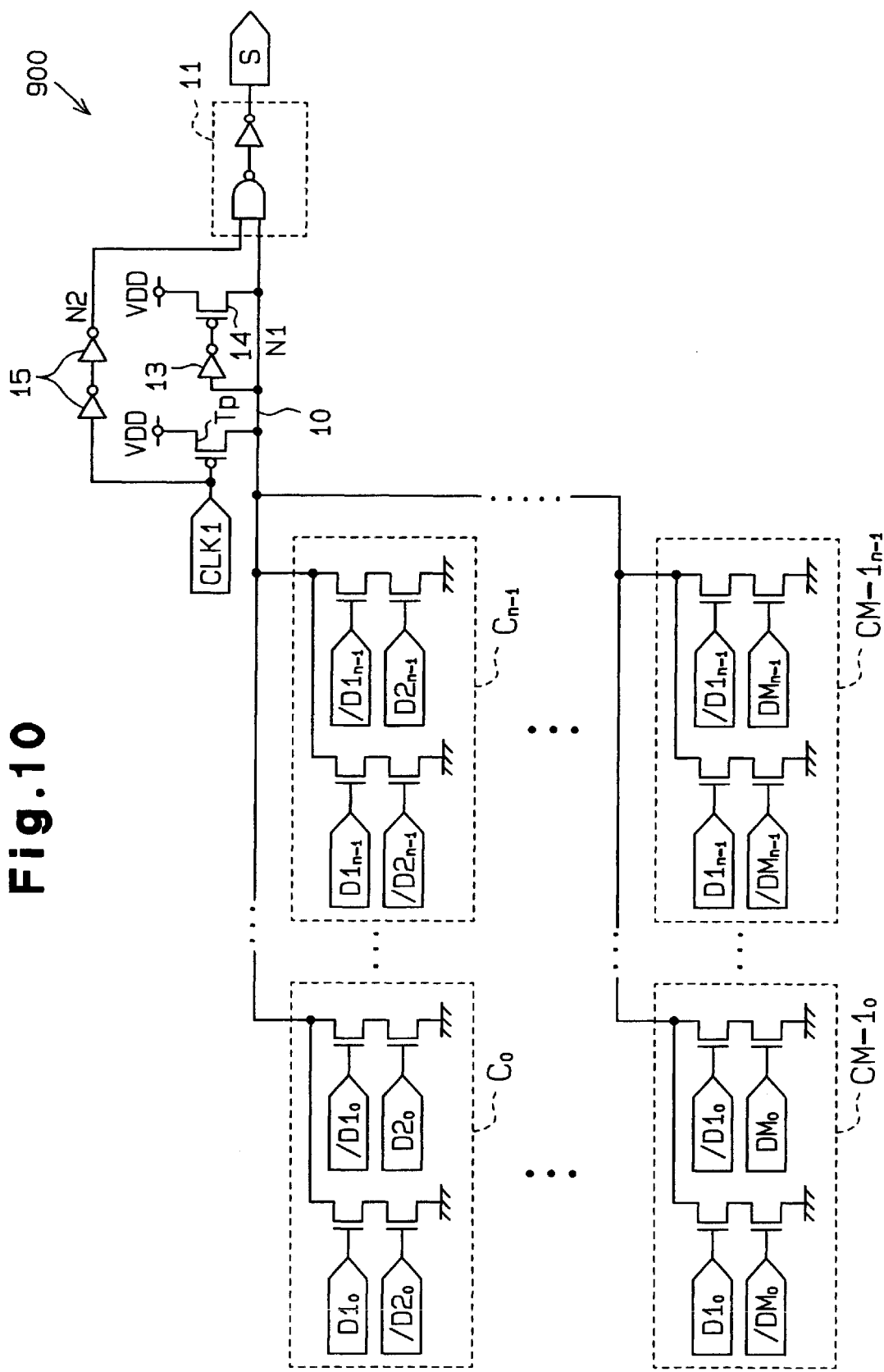
FIG. 10 is a schematic circuit diagram showing a modification of the coincidence determining circuit of FIG. 9.
Figure 11:
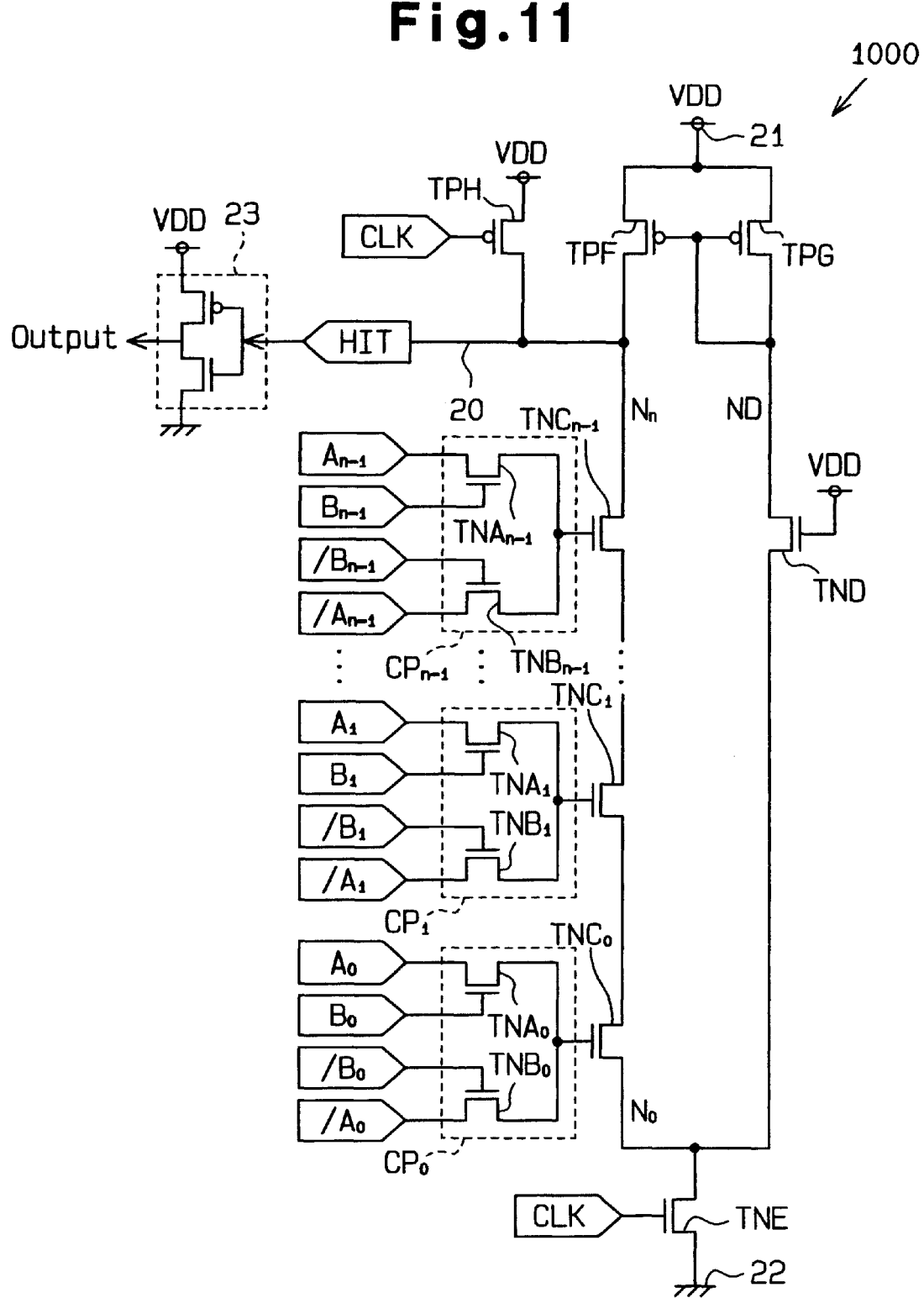
FIG. 11 is a schematic circuit diagram of a digital data coincidence determining circuit according to a fifth embodiment of the present invention.

The coincidence determining circuit 800 may be designed to determine whether not only three pieces of digital data but also four or more pieces of digital data all coincide with one another. FIG. 10 shows a coincidence determining circuit 900 which determines whether M pieces of digital data (D1, D2, ..., DM) each consisting of n bits coincide with one another. This coincidence determining circuit 900 also selects some sets from sets of two in the M pieces of digital data to include every digital data and make it possible to determine if all digital data coincide with one another. Therefore, the coincidence determining circuit 900 includes plural groups of bit comparison circuits to determine whether digital data in each set coincide with each other bit by bit.

To minimize the number of bit comparison circuits, it is preferable to select M-1 sets of digital data. FIG. 10 shows the coincidence determining circuit 900 which includes n x (M-1) bit comparison circuit groups (($C_0, \ldots, C_{n-1}$), ($C2_0, \ldots, C2_{n-1}$), ..., ($CM-1_0, \ldots, CM-1_{n-1}$)) corresponding to M-1 sets (D1 and D2, D1 and D3, ..., D1 and DM).

The coincidence determining circuit 900 of FIG. 10 has the delay circuit 15. Instead of using the delay circuit 15, the clock signal CLK2 that rises later than the clock signal CLK1 may be supplied to the AND circuit 11 as per the first to third embodiments.

The first to fourth embodiments and the modifications of the first to fourth embodiments may be modified as follows.

(a) Instead of precharging the wiring 10 with the supply voltage VDD, the potential of the wiring 10 may be pulled down to the ground potential in the precharge period. In this case, when digital data do not coincide with each other, the associated bit comparison circuit supplies the wiring 10 with a high potential corresponding to the logical level "H". Further, it is preferable that a first set of p-channel transistors and a second set of p-channel transistors should be connected in series between the wiring 10 and the power supply of the voltage VDD. A logical signal corresponding to an associated bit of first digital data is applied to the gate of one of the first set of p-channel transistors and an inverted signal of a logical signal corresponding to an associated bit of second digital data is applied to the gate of the other one of the first set of p-channel transistors. An inverted signal of the logical signal corresponding to the associated bit of the first digital data is applied to the gate of one of the second set of p-channel transistors and the logical signal corresponding to the associated bit of the second digital data is applied to the gate of the other one of the second set of p-channel transistors.

(b) Instead of precharging the wiring 10, whether digital data coincide with each other may be determined from a change in the potential of the wiring 10 according to the input digital data while power is maintained supplied to the wiring.

A digital data coincidence determining circuit 1000 according to the fifth embodiment of the present invention will be described with reference to FIG. 11 and FIGS. 12A to 12D.

The coincidence determining circuit 1000 includes bit comparison circuits ($CP_0$, $CP_1$, ..., $CP_{n-1}$) which generate signals of the logical level "H" (VdD−Vt) when digital data A and B coincide with each other and generate signals of the logical level "L" (VSS+Vt) when digital data A and B do not coincide with each other.

Each bit comparison circuit includes two n-channel transistors ($TNA_0$ and $TNB_0$, $TNA_1$ and $TNB_1$, ..., $TNA_{n-1}$ and $TNB_{n-1}$). A signal having the logical level of an associated bit of the digital data A is applied to a first input/output terminal (drain or source) of a first transistor, and a signal having the logical level of an associated bit of the digital data B is applied to the gate of the first transistor. An inverted signal of the signal having the logical level of the associated bit of the digital data A is applied to a first input/output terminal (drain or source) of a second transistor, and an inverted signal of the signal having the logical level of the associated bit of the digital data B is applied to the gate of the second transistor. Each bit comparison circuit generates a signal of the logical level "H" when the logical signals coincide with each other and the inverted signals coincide with each other and generates a signal of the logical level "L" when there is no coincidence. Second input/output terminals of the two transistors are short-circuited to form the output terminal of the bit comparison circuit.

Connected in series between a high-potential power supply VCC and the ground are n-channel transistors $TNC_0$, $TNC_1$, ..., $TNC_{n-1}$ (hereinafter all of the transistors being denoted by TNC) corresponding in number to the bit comparison circuits. The gates of the transistors are respectively connected to the output terminals of the bit comparison circuits ($CP_0$, $CP_1$, ..., $CP_{n-1}$). When the digital data A and B coincide with each other, each transistor TNC is turned on, so that the state between both ends of the series transistors TNC (between a node $N_n$ and a node $N_0$) becomes a low-resistance state. When the digital data A and B do not coincide with each other, at least one of the transistors TNC is turned off, so that the resistance between both nodes $N_n$, $N_0$ of the transistors TNC becomes extremely large.

Paying attention to the fact that the resistance of the transistors TNC changes in accordance with consistence or non-consistence of digital data A and B, it is determined whether digital data coincide with each other in the fifth embodiment. Specifically, a transistor TND as a resistor connected in parallel to the transistors TNC via a current mirror circuit is used in the fifth embodiment. That is, a coinciding decision is performed based on the potential difference between the resistor and the transistor TNC. The resistor has a resistance higher than the resistance of the transistors TNC when the digital data A and B coincide with each other and lower than the resistance of the transistors TNC when the digital data A and B do not coincide with each other.

The transistor TND as the resistor is always on. The resistance between the source and drain of the transistor TND is set to satisfy the aforementioned condition.

The current mirror circuit detects whether the resistance of the transistors TNC is lower or higher than the resistance of the transistor TND in accordance with consistence or non-consistence of the digital data A and B. The current mirror circuit includes a p-channel transistor TPF and a gate biased transistor TPG. The p-channel transistors TPF and TPG are connected to a power supply 21 and ground 22 via the transistors TNC and the transistor TND. The current mirror circuit operates such that substantially identical currents flow to the drain and source of the transistor TND and both nodes $N_n$, $N_0$ of the transistors TNC. A transistor TNE is connected between a node between the transistors TNC and the transistor TND and the ground. As the ON/OFF action of the transistor TNE is controlled by a predetermined clock signal CLK, power supply by the power supply 21 and the ground 22 is controlled in the cycle of the clock signal CLK.

The amplification function of the current mirror circuit produces a potential difference between the node $N_n$, of the transistors TNC and a node ND of the transistor TNT in accordance with a difference between the resistance of each transistor TNC and the resistance of the transistor TND. The potential difference between the node $N_n$, and the node ND is detected as the potential at the node $N_n$ is output to a wiring 20. The wiring 20 is precharged to the voltage VDD by turning on or off a p-channel transistor TPH in the cycle of the clock signal CLK. When the precharge potential of the wiring 20 (denoted by HIT in FIG. 11) changes due to a change in the potential at the node $N_n$, a signal whose level is an inverted version of a logical level corresponding to the potential of the wiring 20 is output as a decision result from a CMOS inverter 23.

The operation of the coincidence determining circuit 1000 to determine a coincidence between the digital data A and B will be discussed below.

First, when the clock signal CLK, which is supplied to the coincidence determining circuit 1000, falls to the logical level "L", the transistor TNE is turned off, electrically disconnecting the transistors TNC and the transistor TND from the ground 22. At this time, the transistor TPH is turned on, thereby precharging the wiring 20 with the voltage VDD.

After the potential of the wiring 20 is pulled to the precharge voltage VDD, digital data A and B are supplied to the individual bit comparison circuits $C_0$, ..., $C_{n-1}$ When the clock signal CLK rises, the transistor TPH is turned off, thus interrupting the power supply to the wiring 20. Further, the transistor TNE is turned on, connecting the transistors TNC and the transistor TND to the ground 22 so that a change in the potential of the wiring 20 is detected.

That is, when the digital data A and B coincide with each other, the resistance between the nodes $N_0$ and $N_n$ of the transistors TNC is lower than the resistance of the transistor TND so that the potential at the node $N_n$ is pulled down to the ground potential. As a result, the potential of the wiring 20 is pulled down to the ground potential and the coincidence determining circuit 1000 outputs a signal of the logical level "H".

When the digital data A and B do not coincide with each other, the resistance of the transistor TND is lower than the resistance between the nodes $N_0$ and $N_n$ of the transistors TNC so that the potential at the node $N_n$ is maintained at a high potential. As a result, the coincidence determining circuit 1000 outputs a signal of the logical level "L".

A change in the potential of the output signal of the coincidence determining circuit 1000 will be discussed with reference to FIGS. 12A to 12D. FIGS. 12A to 12D show the results of simulation of various signals in the coincidence determining circuit 1000.

Regardless of whether or not the digital data A and B coincide with each other, when the clock signal CLK rises (FIG. 12A), the potential at the node ND is pulled slightly toward the ground potential (FIG. 12B). By contrast, the potential (HIT) of the wiring 20 greatly varies depending on whether or not the digital data A and B coincide with each other (FIG. 12C).

Specifically, when the digital data A and B coincide with each other, the potential (HIT) of the wiring 20 is pulled down to the ground potential and the inverter 23 outputs a signal of the logical level "H" (FIG. 12D). When the digital data A and B do not coincide with each other, the potential (HIT) of the wiring 20 is maintained substantially at the precharge potential (FIG. 12C) even after the rising of the clock signal CLK (FIG. 12A). Therefore, the inverter 23 outputs a signal of the logical level "L" (FIG. 12D).

The coincidence determining circuit 1000 according to the fifth embodiment has the following advantages.

(1) A coinciding decision of digital data A and B is performed bit by bit using the bit comparison circuits each comprising two n-channel transistors. Even if the number of bits of the digital data A and B increases, an increase in the circuit area of the coincidence determining circuit is restrained.

(2) The inverter 23 generates a stable coincidence decision signal of the logical level "H" or the logical level "L".

A digital data coincidence determining circuit 1100 according to the sixth embodiment of the present invention will be described centering on the difference from the coincidence determining circuit 1000 of the fifth embodiment with reference to FIGS. 13, 14A and 14B.

Figure 13:
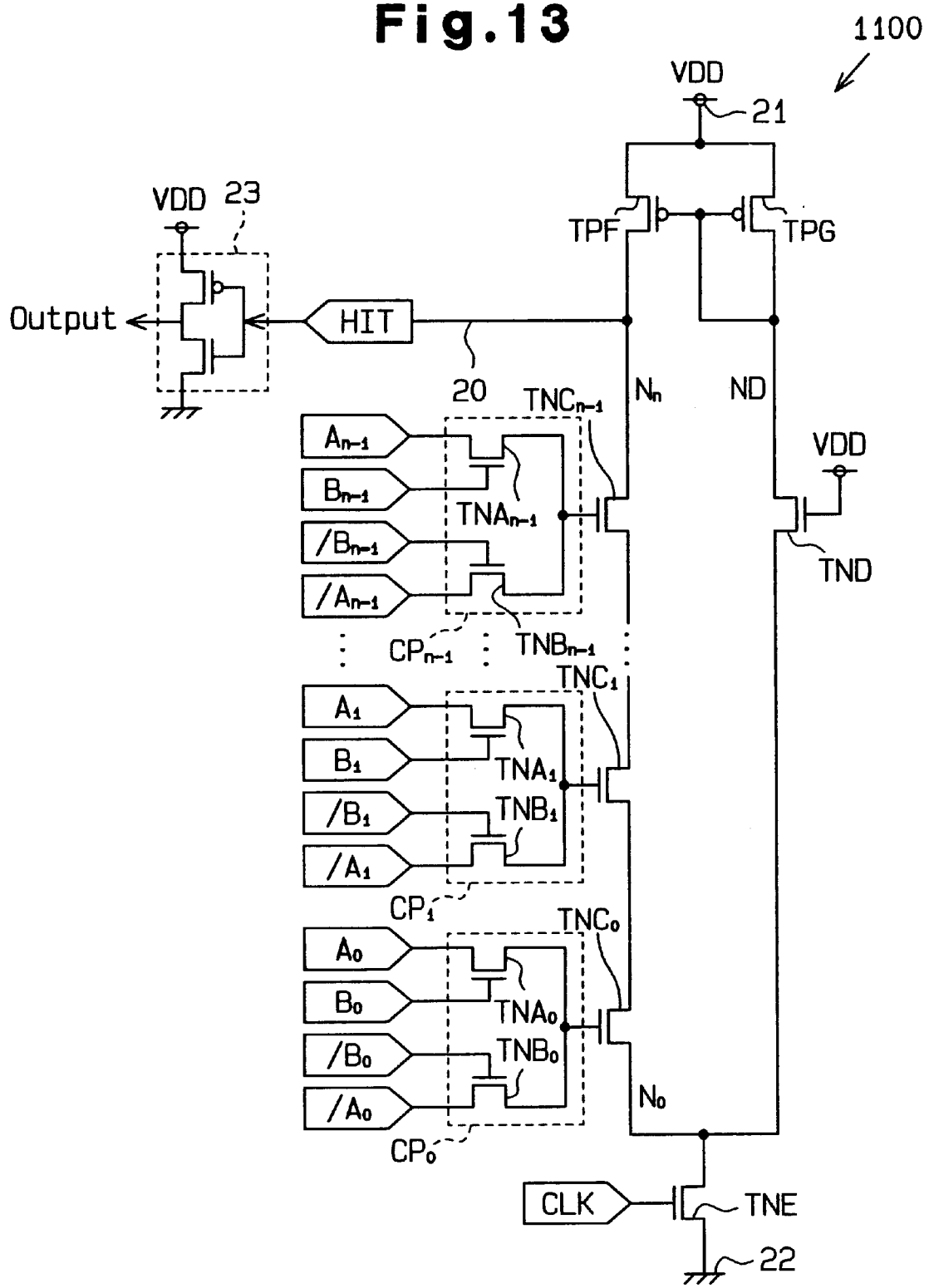
FIG. 13 is a schematic circuit diagram of a digital data coincidence determining circuit according to a sixth embodiment of the present invention.
Figure 14A:
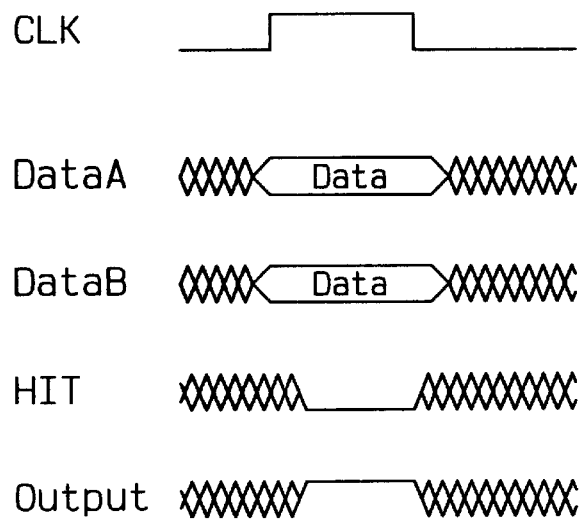
FIGS. 14A and 14B show a time chart for explaining the operation of the coincidence determining circuit of FIG. 13.
Figure 14B:
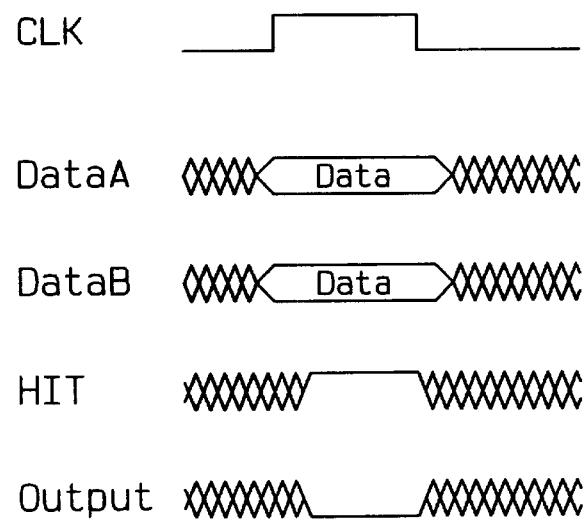

As shown in FIG. 13, a precharge circuit for precharging the wiring 20 is omitted in the sixth embodiment. The coincidence determining operation of the coincidence determining circuit 1100 will be described with reference to FIGS. 14A and 14B.

<Case Where Digital Data A and B Coincide With Each Other; FIG. 14A>

When the clock signal CLK has a logical level "L", the potential of the wiring 20 is unstable. When the clock signal CLK rises, the transistor TNE is turned on, electrically connecting the transistor TND and transistors TNC to the ground 22. At this time, the resistance between the nodes $N_0$ and $N_n$ of the transistors TNC is lower than the resistance of the transistor TND so that the potential (HIT) of the wiring 20 is pulled down to the ground potential. As a result, the coincidence determining circuit 1100 outputs a signal of the logical level "H".

<Case Where Digital Data A and B do not Coincide With Each Other; FIG. 14B>

When the clock signal CLK has the logical level "L", the potential of the wiring 20 is unstable. When the clock signal CLK rises, the transistor TNE is turned on. At this time, the resistance of the transistor TND is lower than the resistance between the nodes $N_0$ and $N_n$ of the transistors TNC so that the potential (HIT) of the wiring 20 is pulled up to the voltage VDD by the current that flows through the transistor TPF. As a result, the coincidence determining circuit 1100 outputs a signal of the logical level "L".

The coincidence determining circuit 1100 according to the sixth embodiment has the same advantages as the coincidence determining circuit 1000 of the fifth embodiment.

A digital data coincidence determining circuit 1200 according to the seventh embodiment of the invention will be described centering on the difference from the coincidence determining circuit 1000 of the fifth embodiment.

Figure 15:
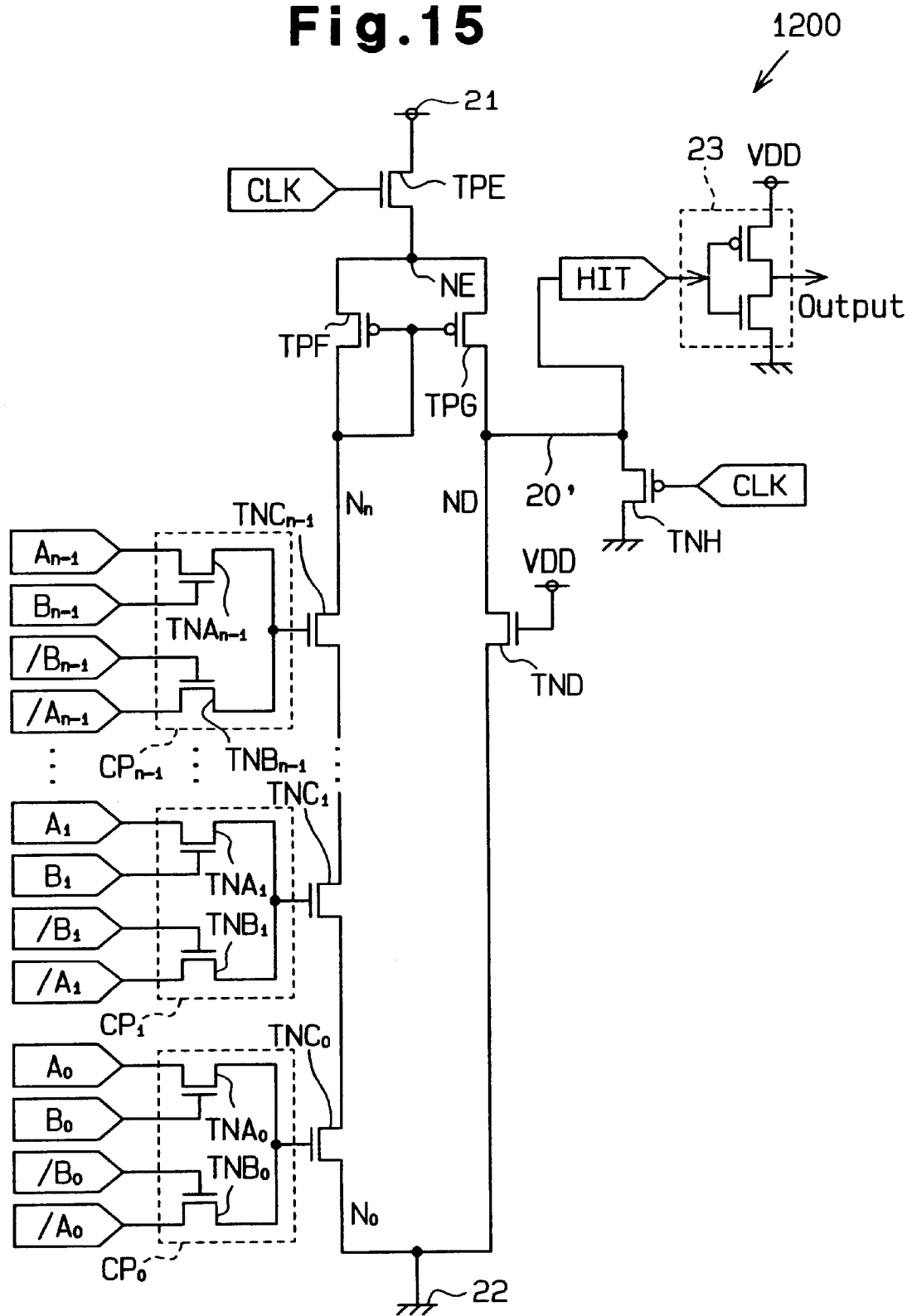
FIG. 15 is a schematic circuit diagram of a digital data coincidence determining circuit according to a seventh embodiment of the present invention.

In the fifth embodiment, a coincidence between digital data A and B is determined based on a change in the potential at the node $N_n$ of the transistors TNC. In the seventh embodiment, as the current mirror circuit is modified as shown in FIG. 15, such a coincidence is determined based on a change in the potential at the node ND of the transistor TND.

The current mirror circuit includes the transistor TPG and the gate biased transistor TPF and operates such that substantially identical currents flow through the transistors TNC and the transistor TND due to power supply from the power supply 21 and the ground 22. A p-channel transistor TPE is connected between a node between the transistors TPF and TPC and the power supply 21. As the ON/OFF action of the transistor TPE is controlled, power supply to the transistors TPF and TPG from the power supply 21 is controlled. The ON/OFF control of the transistor TPE is performed by applying the clock signal CLK of a predetermined cycle to the gate of the transistor TPE.

The relation between the magnitudes of the resistance of the transistors TNC and the resistance of the transistor TND, which changes in accordance with a coincidence or discrepancy of digital data A and B, is detected as changes in the potentials at the node $N_n$ and the node ND. The potential variations are detected by a change in the potential at the node ND. A wiring 20' is connected to the node ND. The wiring 20' is pulled down to the ground potential via an n-channel transistor THN in the cycle of the clock signal CLK. When the potential of the wiring 20' (denoted by HIT) changes due to a change in the potential at the node ND, an inverted signal whose logical level corresponds to the potential of the wiring 20' is output from the inverter 23 as a decision result.

The coincidence deciding operation of the coincidence determining circuit 1200 according to the seventh embodiment of the present invention will be discussed below.

The coincidence determining circuit 1200 pulls down the potential of the wiring 20' in response to the clock signal CLK having the logical level "H". Specifically, when the clock signal CLK rises to the logical level "H", the transistor TNH is turned on, thus pulling down the potential of the wiring 20' to the ground potential. When the clock signal CLK is at the logical level "H", therefore, the inverter 23 outputs a signal of the logical level "H".

When the clock signal CLK falls to the logical level "L", the transistor TPE is turned on, thus pulling up the potential of the drains (node NE) of the transistors TPF and TPG to the voltage VDD. Further, the transistor TNH is turned off, electrically disconnecting the wiring 20' from the ground.

When two pieces of digital data A and B coincide with each other, the resistance of the transistor TND is higher than the resistance of the transistors TNC, so that the potential at the node ND is pulled up to the voltage VDD of the power supply 21. Accordingly, the potential (HIT) of the wiring 20' is also pulled up to the voltage VDD so that the coincidence determining circuit 1200 outputs a signal of the logical level "L".

When two pieces of digital data A and B do not coincide with each other, the resistance of the transistors TNC is higher than the resistance of the transistor TND, so that the potential at the node ND is maintained at a low potential. Accordingly, the potential (HIT) of the wiring 20' is also maintained at a low potential so that the coincidence determining circuit 1200 outputs a signal of the logical level "H".

The coincidence determining circuit 1200 according to the seventh embodiment also has the same advantages as the coincidence determining circuit 1000 of the fifth embodiment.

The fifth to seventh embodiments may be modified as follows.

Figure 16:
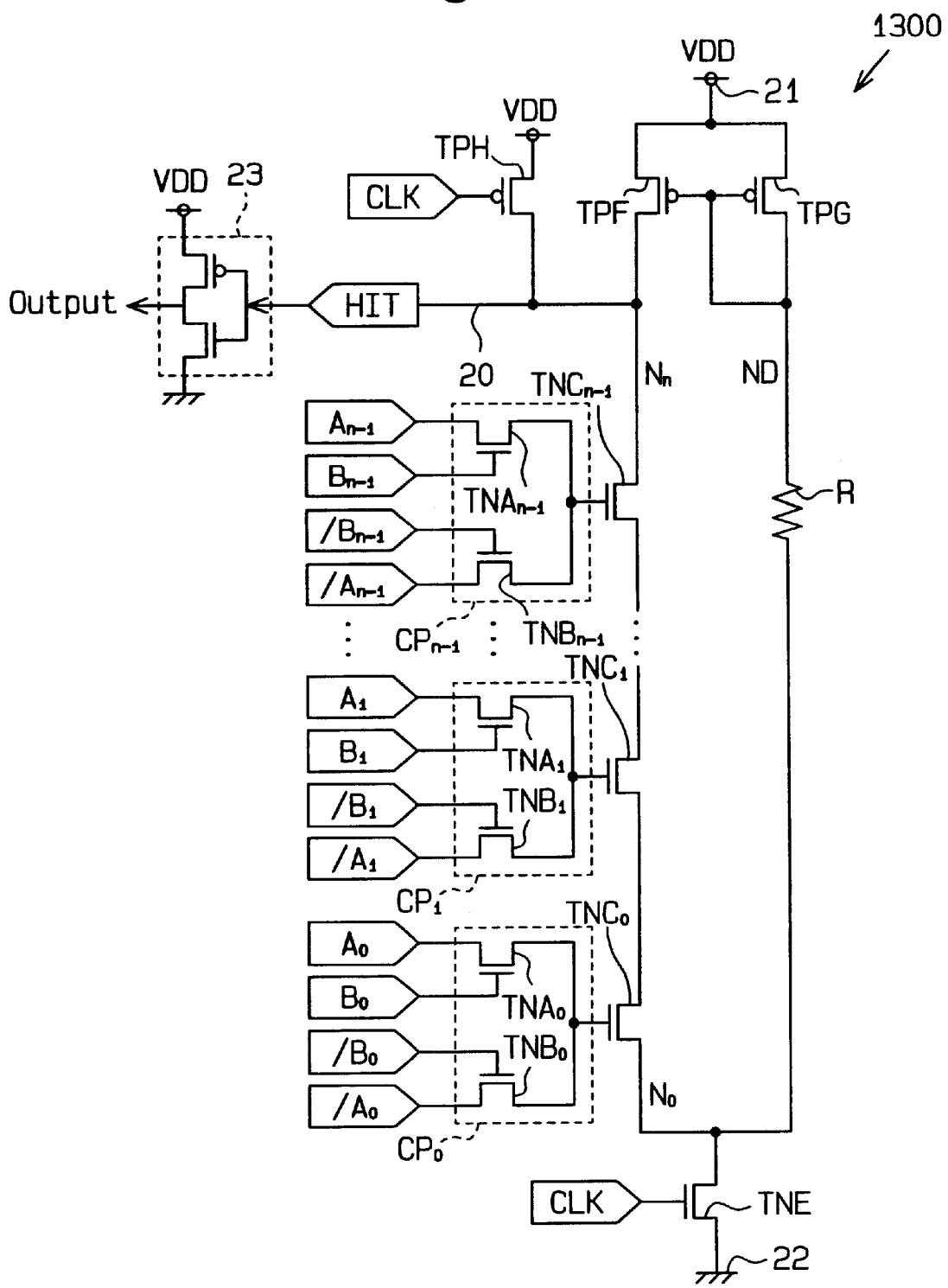
FIG. 16 is a schematic circuit diagram showing a modification of the coincidence determining circuit of FIG. 11.

(a) A resistive wiring may be used in place of the transistor TND as a resistor. FIG. 16 is a schematic circuit diagram showing a coincidence determining circuit 1300 having a resistor R in place of the transistor TND.

(b) The present invention may be adapted not only to determination of a coincidence between two pieces of digital data A and B but also to determination of a coincidence among three or more pieces of digital data. To determine whether all of M pieces of digital data each consisting of n bits coincide with one another, combinations of data as mentioned in the foregoing descriptions of the fourth embodiment and its modification can be used. That is, some sets are selected from sets of two in M pieces of digital data to include every digital data and make it possible to determine if all digital data coincide with one another. The bit comparison circuits according to the fifth to seventh embodiments are used to determine whether digital data in each selected set coincide with each other.

Figure 17:
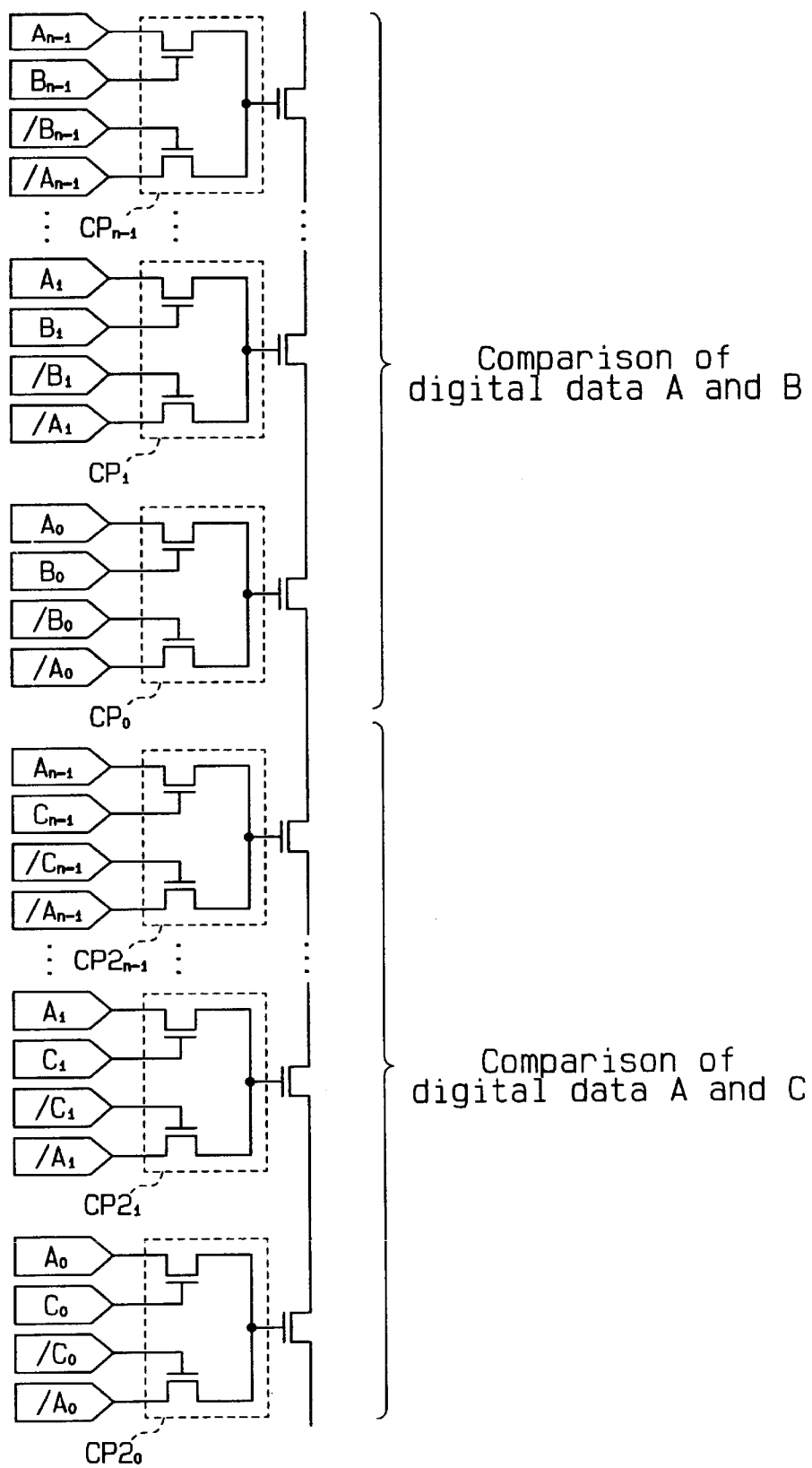
FIG. 17 is a schematic circuit diagram illustrating a first modification of the coincidence determining circuits of FIGS. 11, 13 and 15.

FIG. 17 is a schematic circuit diagram illustrating a circuit which determines if three pieces of digital data coincide with one another. In this circuit, a coincidence between digital data A and B is determined by using bit comparison circuits $CP_0, \ldots, CP_{n-1}$ and a coincidence between digital data A and C is determined by using bit comparison circuits $CP2_0, \ldots, CP2_{n-1}$, so that it is determined if all the digital data A, B and C coincide with one another. To determine if all the digital data A, B and C coincide with one another, the digital data A and B and the digital data B and C, for example, may be selected in addition to the aforementioned combinations.

Figure 18:
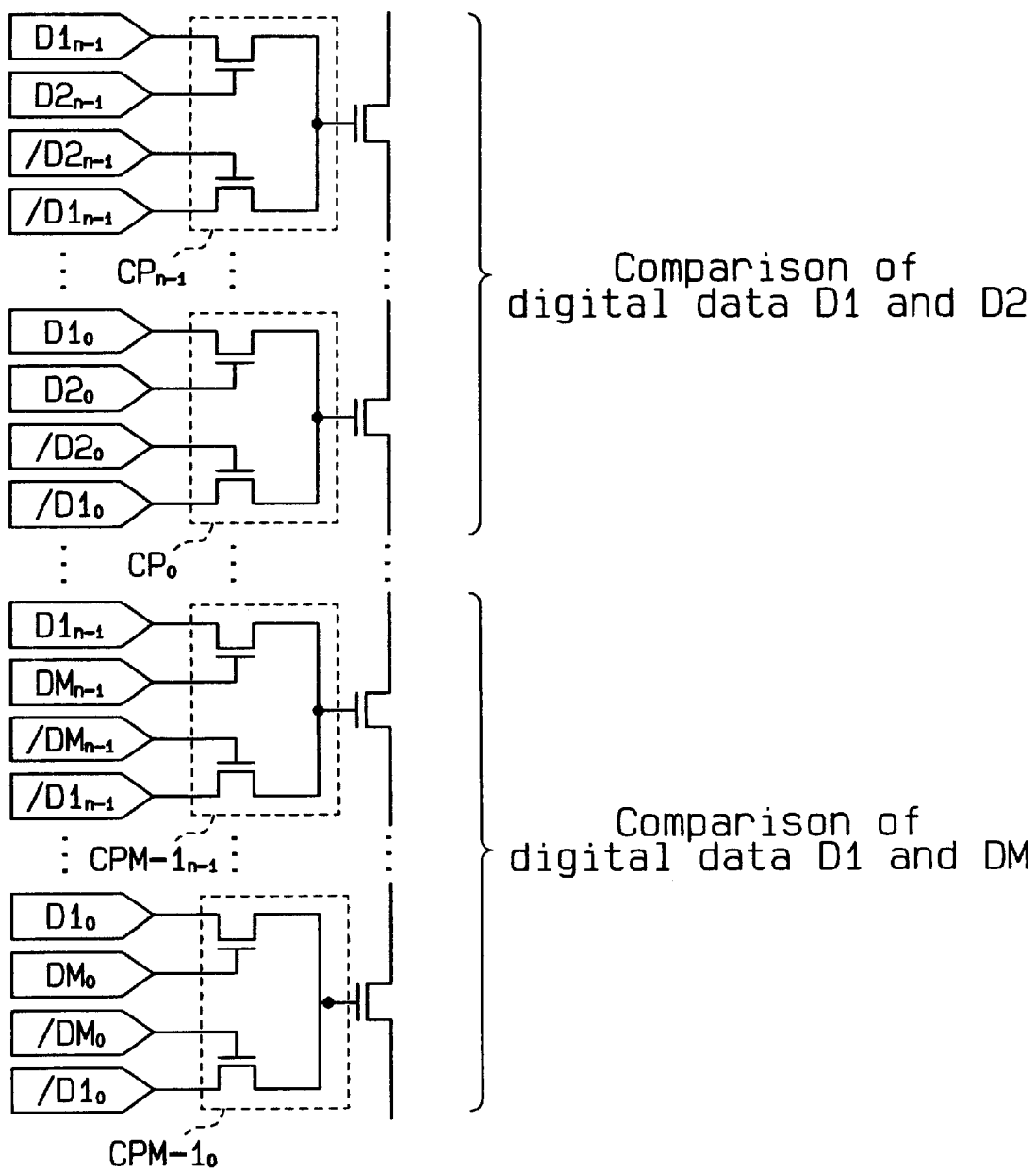
FIG. 18 is a schematic circuit diagram illustrating a second modification of the coincidence determining circuits in FIGS. 11, 13 and 15.

FIG. 18 is a schematic circuit diagram illustrating a circuit which determines whether all of M pieces of digital data (D1, D2, ..., DM) each consisting of n bits coincide with one another. The circuit, like the circuit in FIG. 10, selects some sets (M-1 sets: D1 and D2, D1 and D3, ..., D1 and DM) from sets of two in M pieces of digital data to include every digital data and make it possible to determine if all digital data coincide with one another. Then, the digital data in the selected set are compared with each other by using the bit comparison circuits $((CP_0, \ldots, CP_{n-1}), \ldots, (CPM\text{-}_0, \ldots, CPM\text{-}1_{n-1}))$ corresponding to the selected set.

(c) The method of supplying digital data to the bit comparison circuits is not limited to those of the fifth to seventh embodiments. For example, digital data may be supplied to the bit comparison circuits such that a signal of the logical level "H" is output when two pieces of digital data coincide with each other and a signal of the logical level "L" is output when there is no coincidence.

(d) Each bit comparison circuit may comprise two p-channel transistors instead of two n-channel transistors. In this case, associated bit data of two pieces of digital data are supplied to the two p-channel transistors such that the bit comparison circuit outputs a signal of the logical level "H" or a signal of the logical level "L" in accordance with a coincidence or no coincidence between digital data.

(e) The current mirror circuit may use bipolar transistors in place of the transistors TPF and TPG to allow substantially identical currents to flow to the transistors TNC and TND. In this case, the bases of the bipolar transistors are biased.

(f) The transistors TNC may be switching transistors as well as n-channel transistors. In case where p-channel transistors are used, for example, the potentials at both nodes of the transistors are set such that all of the p-channel transistors are turned on when digital data A and B coincide with each other. In this case, each bit comparison circuit and a method of inputting digital data to the bit comparison circuit are modified such that a signal of the logical level "H" is generated when there is a coincidence or a signal of the logical level "L" is generated when there is no coincidence.

(g) A circuit other than the current mirror circuit may be used to detect a change in the resistance of the transistors TNC. For example, the detection may be performed using a circuit which determines that two pieces of digital data coincide with each other when a predetermined current flows through a transistor connected in series between a pair of power supply terminals.

Figure 19:
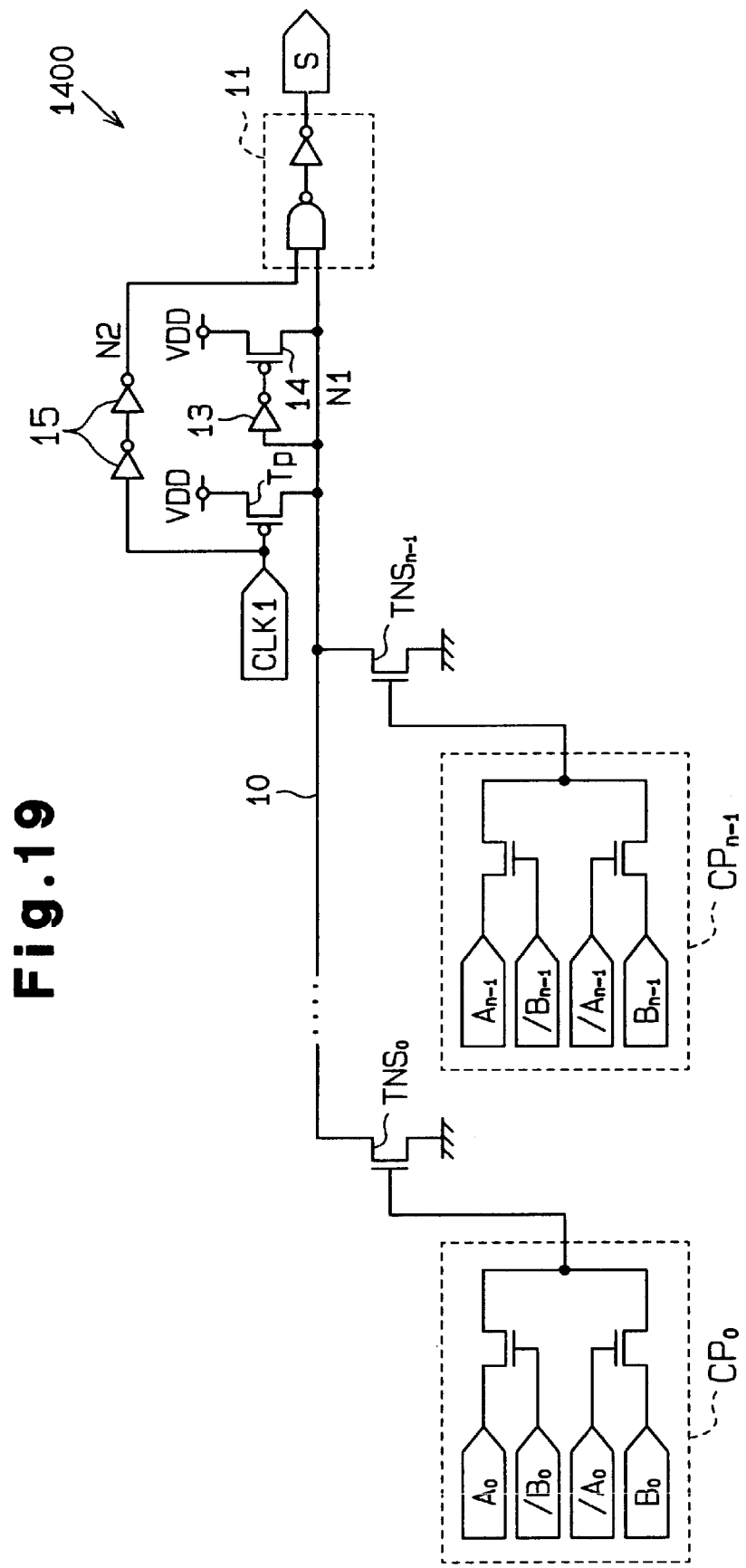
FIG. 19 is a schematic circuit diagram illustrating a third modification of the coincidence determining circuits of FIGS. 11, 13 and 15.

(h) As shown in FIG. 19, each bit comparison circuit may be connected to the wiring 10 via an n-channel transistor $TNS_0, TNS_1, \ldots, TNS_{n-1}$. The wiring 10 is a precharging wiring identical to the wiring 10 of the circuit in FIG. 8. The n-channel transistors $TNS_0, TNS_1, \ldots, TNS_{n-1}$ control electric connection between the wiring 10 and the ground. A coincidence determining circuit 1400 of FIG. 19 outputs a decision result based on a change in the potential of the wiring 10. When digital data A and B coincide with each other, all of the bit comparison circuits output signals of the logical level "L" and the wiring 10 is maintained at the precharge potential. When digital data A and B do not coincide with each other, at least one bit comparison circuit outputs a signal of the logical level "H" to the gate of the associated transistor TNS, thus pulling down the potential of the wiring 10 to the ground potential.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A coincidence determining circuit for determining whether plural pieces of digital data, which includes first digital data and second digital data each consisting of a plurality of bits, coincide with one another, comprising:
    a wiring;
    a plurality of bit comparison circuits connected to the wiring and corresponding in number to the plurality of bits, each bit comparison circuit including:
        first and second transistors connected in series between the wiring and a power supply line, the first transistor having a first control terminal to which a first logical signal of an associated bit of the first digital data is applied, the second transistor having a second control terminal to which an inverted signal of a second logical signal of an associated bit of the second digital data is applied, and third and fourth transistors connected in series between the wiring and the power supply line, the third transistor having a third control terminal to which an inverted signal of the first logical signal is applied, the fourth transistor having a fourth control terminal to which the second logical signal is applied, wherein the first to fourth transistors change a potential of the wiring by controlling conduction between the wiring and the power supply line and it is determined based on a change in the potential whether the plural pieces of digital data coincide with one another;

a precharge circuit, connected to the wiring, for precharging the wiring to a predetermined precharge potential in response to a first clock signal; and a determination signal generating circuit, connected to the wiring, for generating a determination signal indicating whether the plural pieces of digital data coincide with one another in response to a second clock signal delayed by a predetermined time from the first clock signal.

2. The coincidence determining circuit according to claim 1, wherein the precharge circuit includes a fifth transistor which is connected between the wiring and a power supply for supplying the predetermined precharge potential and is responsive to the first clock signal.

3. The coincidence determining circuit according to claim 1, further comprising a holding circuit, connected to the wiring, for holding the predetermined precharge potential of the wiring.

4. The coincidence determining circuit according to claim 3, wherein the holding circuit is a capacitor connected between the wiring and the power supply line.

5. The coincidence determining circuit according to claim 1, further comprising a latch circuit, connected to the wiring, for holding the predetermined precharge potential of the wiring.

6. The coincidence determining circuit according to claim 5, wherein the latch circuit includes a fifth transistor connected between the wiring and a power supply for supplying the predetermined precharge potential; and an inverter circuit connected between a gate of the fifth transistor and the wiring.

7. The coincidence determining circuit according to claim 1, wherein the plural pieces of digital data include third digital data consisting of a plurality of bits, and the coincidence determining circuit further comprises:

a second wiring connected to the wiring; and a plurality of second bit comparison circuits connected to the second wiring and corresponding in number to the plurality of bits of the third digital data, each of the second bit comparison circuits including:

fifth and sixth transistors connected in series between the second wiring and the power supply line, the fifth transistor having a fifth control terminal to which the first logical signal is applied, the sixth transistor having a sixth control terminal to which an inverted signal of a third logical signal corresponding to at least one bit of the third digital data is applied, and seventh and eighth transistors connected in series between the second wiring and the power supply line, the seventh transistor having a seventh control terminal to which the inverted signal of the first logical signal is applied, the eighth transistor having an eighth control terminal to which the third logical signal is applied.

* * * * *